Dec. 4, 1956  E. MERTEN  2,772,746
SEISMIC EXPLORATION APPARATUS
Filed July 18, 1955

INVENTOR:
EUGEN MERTEN
BY: J. H. McCarthy
HIS AGENT

United States Patent Office 2,772,746
Patented Dec. 4, 1956

2,772,746

SEISMIC EXPLORATION APPARATUS

Eugen Merten, Houston, Tex., assignor to Shell Development Company, New York, N. Y., a corporation of Delaware Application July 18, 1955, Serial No. 522,543

3 Claims. (Cl. 181—.5)

This invention relates to geophysical exploration and pertains more particularly to apparatus for generating seismic waves such as employed in seimic prospecting methods.

In seismic prospecting, the strata near the earth's surface are investigated by studying records of artificially produced elastic or seismic waves. By this method artificial disturbances produced at a shot-point station cause the earth to be set in motion, and said motion is detected and recordel at several seismometer stations located at known distances from the shot-point station.

The general method of creating an artificial disturbance in the earth's surface is to drill a shot hole into the earth's surface below the so-called weathered layer and to position a charge of dynamite at the bottom of the hole where it is exploded. This method is relatively expensive, time-consuming and dangerous, as considerable time must be expended in drilling the holes and there is a certain element of danger in handling the dynamite charges and loading them into the shot holes. Additionally, the resultant explosion from the dynamite normally causes a cavity in the earth which makes it impossible to fire two shots at the same point under identical conditions, and which furthermore must be filled in afterwards or remain a hazard to people and livestock.

It is also known to create seismic waves in the earth's surface by exploding a plurality of dynamite charges in the air at a fixed height above the earth's surface, said charges being set in a widely-spaced predetermined pattern. This method can normally be employed only in unpopulated and wide open spaces; moreover, the amount of energy transmitted to the ground is relatively small.

Another well-known method of creating an artificial disturbance in the earth's surface is to drop a heavy weight on the ground, a method which can successfully be used in some areas. Due to the unevenness of the terrain being explored, it is not always possible to drop the weight from the same height each time a shot is to be recorded. Additionally, the mechanism for releasing the weight at the drop signal does not always function with the same smoothness each time. Because of these two factors, the time interval between the signal releasing the weight and the time it contacts the ground is not always the same. Since the recording system which forms the seismogram traces starts recording at the time the weight is released, the arrivals of the waves as shown on different seismograms may not be properly synchronized with each other due to the time variation between the signal releasing the weight and its contact with the ground. This error necessitates the shifting of seismograms during the study of the results, especially in cases when reproducible recording, e. g. on a magnetic tape, is used.

It is therefore a primary object of this invention to provide an apparatus for creating seismic waves wherein the explosive charge is positioned on the earth's surface in contact therewith and does not appreciably injure the surface of the earth during the explosion.

A further object of this invention is to provide seismic wave generating equipment adapted to be mounted on a truck or a trailer and readily moved from location to location, so that large numbers of shots may be made over wide areas during a single day.

Another object of this invention is to provide an apparatus of simple design for creating seismic waves, said apparatus employing an inexpensive form of explosive material capable of generating an explosion free of certain undesirable effects inherent in the so-called "dynamite spectrum."

A still further object of this invention is to provide seismic wave generating equipment wherein the ignition time of the generated explosion and its impact upon the earth's surface is substantially simultaneous.

Another object of the present invention is to provide equipment for generating seismic waves on the surface of the earth without creating substantially any air noise.

These and other objects of this invention will be understood from the following description taken with reference to the drawing, wherein.

Figure 1:
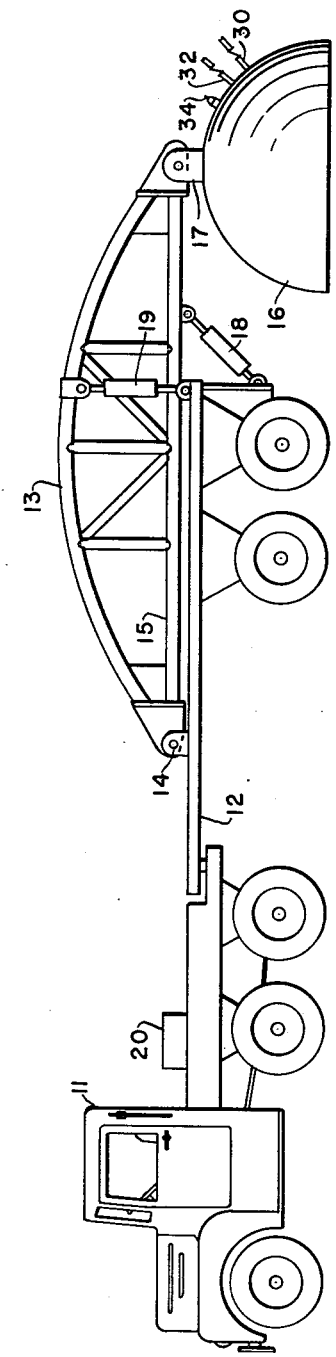
Figure 1 is a side view of the present seismic wave generating equipment mounted on a truck-drawn trailer.

Referring to Figure 1 of the drawing, a truck 11 is shown for towing a trailer 12. Mounted longitudinally on the bed of the trailer 12 is a bridge or truss member 13 which is hinged to the truck at one end by a suitable hinge element 14 with the other end of the bridge 13 free for limited pivotal movement about hinge 14. The bridge element 13 may be of any form suitable for supporting a weight of from one to five tons. In its simplest form, the present bridge would comprise a single horizontal girder 15, which forms the base member for the arcuate bridge member 13.

One end of the bridge 13 overhangs the end of the trailer 12, as illustrated, so that a large-diameter bell 16 may be secured thereto, preferably in a pivotal manner as by a universal joint or hinge 17. One or more shock absorbers 18 are provided between the bridge 13 and the trailer 12 to slow down and limit the sudden rise of the bell 16 and bridge 13 off the bed of the trailer 12.

Figure 2:
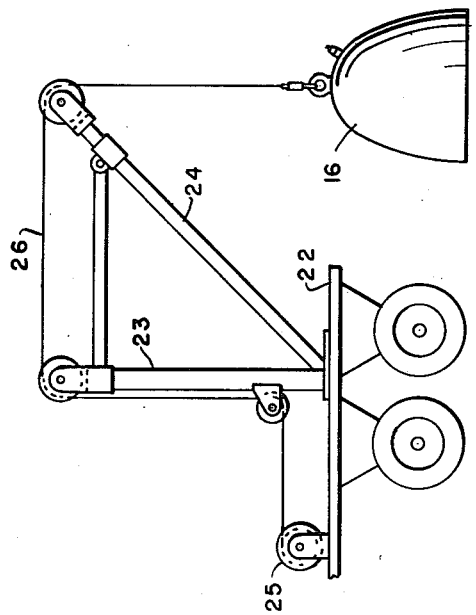
Figure 2 is another form of the seismic wave generating equipment of the present invention.

Additionally, the trailer 12 is provided with means for lifting the bridge 13 off the bed of the trailer 12, thus causing the bell 16 to be lifted above the ground level while the bell is being transported from one place to another. While mechanical jacks could be employed between the trailer bed 12 and the bridge 13, the hoist means shown at 19 is preferably of the hydraulically-operated piston type which is well known to the art. Hydraulic pressure fluid for actuating the hoist means 19 is provided from any suitable source 20 which is connected to the one or more hydraulic lifting cylinders 19 by suitable hoses (not shown).

Where shock absorbers of recoil mechanism 18 (Figure 1) are not needed between the trailer 12 and the bridge 13, a more simple form of hoisting equipment may be mounted on a truck bed or trailer 22, as shown in Figure 2. In this embodiment the hoisting mechanism comprises a mast 23, boom 24 and winch means 25 for reeling in a cable 26 attached to the top of the bell 16. The boom 24 is of sufficient length to swing the bell 16 beyond the end of the trailer 22. If desired, the winch means 25 may be mounted at the base of the mast 23 so that the entire hoisting apparatus may be pivoted 180 degrees so as to load the bell 16 on the trailer for transporting it to another location. For short moves, the bell can be transported while being suspended from the boom 24 a few feet off the ground, with the boom in a slightly raised position from that illustrated in Figure 2.

The bell 16 may be of any suitable shape so that when the bell is placed on the surface of the earth, a chamber 28 (Figures 3 and 4) is formed within the bell with ground level 29 forming one wall of the chamber 28. The bell 16 may be of any size and weight, these factors being limited only by the carrying and hoisting capacity of the truck 11 and trailer 12. A further limiting factor as to the weight of the bell 16 is that it must be small enough to be transported over rough terrain by the truck and trailer. In general, a bell 16 of hemispherical shape having a diameter or horizontal dimension of from 3 to 10 feet is employed with the wall thickness of the bell 16 being selected so as to give a bell weighing from one to five tons or more. The bell may be cased in metal, reinforced cement, or any other suitable heavy material.

The bell 16 is provided with a conduit 30 normally closed by check valve 31 through which a readily explosible gas or mixture of gases, for example, acetylene and air, may be introduced into the chamber 28 of the bell. The bell 16 may be further provided with a second conduit 32, preferably closed by valve 33 which serves as a vent for gases generated by the explosion. The bell 16 is also equipped with means for igniting the explosive gases within the chamber 28, such, for example, as one or more spark plugs 34 which are energized by any suitable power source (not shown). The burning rate of the gas within the chamber 28 depends mainly upon the number of spark plugs 34 employed, a faster explosion resulting when a greater number of spark plugs is employed.

Figure 3:
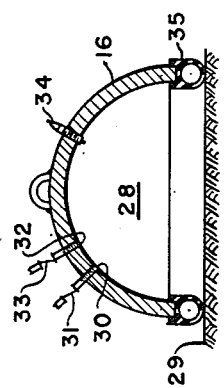
Figures 3 and 4 are cross-sectional views of two embodiments of the chamber in which the explosion is produced.

If desired, a relatively stiff yet flexible tube or other sealing means may be mounted on the periphery of the bell as shown in Figure 3 to give better rim contact with the ground. The peripheral tube 35 may be of the general construction of an inflatable automobile tire or tube, and if desired may be filled with air or water.

Figure 4:
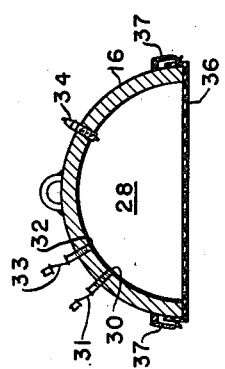

A preferred form of the bell 16 is shown in Figure 4 which is provided with a thin flexible diaphragm, for example, a rubber membrane 36 which closes the open end of the bell. Clamp means 37 of a suitable type may be provided for maintaining the diaphragm 36 on the end of the bell 16. In certain cases it is not necessary to secure the diaphragm to the end of the bell as the same result can be obtained by laying a sheet of flexible gas-impervious material (rubber, plastic, etc.) on the ground before lowering the bell on it.

When it is desired to introduce the explosive gas mixture into the chamber 28 in the bell 16 under considerable pressure, a diaphragm-closed bell as shown in Figure 4 is used to prevent large losses of the gas to the earth and to prevent leakage of the gas from around the bottom of the bell. When working with high gas pressures the check valve 33 on the gas vent 32 is set so as to contain the gas in the bell before explosion. It is obvious that an open end bell not having a diaphragm mounted thereon would not necessarily need an air vent 32 since the gases could escape from the bottom of the bell as it rose slightly from the ground during an explosion.

While a bell 16 having a hemispherical shape is preferred, the bell 16 may be also of semi-elliptical shape, as shown in Figure 2, or of any other form adapted to form a gas-containing chamber. By employing an air vent 32, as shown in Figure 4, the gases in the chamber 28 after the explosion are allowed to escape without rupturing the diaphragm 36. In operation the seismic wave generating apparatus of the present invention is positioned over a predetermined shot point, as shown in Figure 1, with a plurality of seismometers (not shown) set in a predetermined pattern at some distance away. With the bell 16 weighing three tons and having a five-foot diameter resting on the ground, an explosive gas mixture is pumped into the bell through conduit 30 to a predetermined pressure. When current is passed through the spark plug or plugs 34 there is an instantaneous explosion with seismic waves being generated within the chamber 28 and reflected into the surface of the earth, the greatest impact of said waves being at the moment of the explosion.

By employing the seismic wave generating devices of the present invention, a sharp impact on the ground is realized without any air noise, the vent or vents 32 in the shell of the bell allowing for the gradual escape of gases therefrom without blowing dust from around the bottom of the bell which is preferably closed by a rubber membrane. The peak of the shock wave generated by the present apparatus is determined by the time it takes for the gas to completely burn, which in turn is dependent upon the gas mixture, its pressure, and the number of spark plugs 34 employed.

If only small amounts of gas at low pressures are to be exploded, a bell 16 supported in a manner shown in Figure 2 can be employed as there is little movement of the bell, if any, during an explosion. However, for large explosions employing high gas pressures, the bell 16 (Figure 1) is driven up in the air due to the force of the explosion but the shock absorbers 18 between the trailer 12 and bridge 13 act as recoil mechanisms to slow down the upward movement of the bell. In very large explosions the trailer 12 may also be lifted off the ground during the explosion but its added weight also tends to restrain the heavy bell from rising higher.

By employing the present seismic wave generating device, less air noise is realized than when dynamite charges are exploded in the air. Additionally, better signals are generated by the seismometers, as there is a faster acceleration of the seismometers by this method as compared with the generation of seismic waves by a dropping weight.

After an explosion, the bridge 13 and bell 16 may be raised a few feet by hydraulic jack 19 while the apparatus is moved to other shot-point locations where additional shots can be recorded. After the bridge 13 has been raised off the trailer 12 it may be wedged in place in any suitable manner so that the lifting force of the hydraulic jack 19 may be released during transportation.

I claim as my invention:

1. Apparatus for generating seismic waves for geophysical exploration purposes, said apparatus comprising a heavy thick-walled bell adapted to be positioned with its open side in contact with the surface of the ground, thereby defining a closed chamber, a flexible diaphragm closing the open side of said bell in a gastight manner, valved conduit means through the wall of said bell for introducing an explosive gas mixture into said chamber, ignition means extending into said bell adapted to explode the gas within the chamber of said bell, and valved conduit means through the wall of said bell for releasing exploded gases therefrom.

2. Apparatus for generating seismic waves employed in geophyiscal prospecting and directing said waves into the ground, said apparatus comprising a heavy thick-walled bell open on one side and having a concave chamber formed therein, said bell being adapted for positioning with its open side in contact with the surface of the ground, a flexible diaphragm secured to the rim of said bell and extending over the open side thereof for closing said bell in a fluidtight manner, thereby forming therein a closed chamber for containing an explosive gas mixture, valved conduit means through the wall of said bell for introducing an explosive gas mixture into the chamber to a predetermined pressure, vent means through the wall of said bell for venting gases therefrom after an explosion, gas-igniting means extending through the wall of said bell and adapted to be energized to ignite said gas and cause an explosion within the chamber of said bell, the heavy walls of said bell being formed to direct the elastic wave generated by said explosion into the surface of the earth, vehicle means for transporting said bell between shot-point locations, and hoist means carried by said vehicle means for hoisting said bell off the ground.

3. Apparatus for generating seismic waves employed in geophysical prospecting and directing said waves into the ground, said apparatus comprising a heavy thick-walled bell open on one side and having a concave chamber formed therein, said bell being adapted for positioning with its open side in contact with the surface of the ground, a flexible diaphragm secured to the rim of said bell and extending over the open side thereof for closing said bell in a fluidtight manner, thereby forming therein a closed chamber for containing an explosive gas mixture, valved conduit means through the wall of said bell for introducing an explosive gas mixture into the chamber to a predetermined pressure, vent means through the wall of said bell for venting gases therefrom after an explosion, gas-igniting means extending through the wall of said bell and adapted to be energized to ignite said gas and cause an explosion within the chamber of said bell, the heavy walls of said bell being formed to direct the elastic wave generated by said explosion into the surface of the earth, vehicle means for transporting said bell between shot-point locations, truss means carried on the bed of said vehicle means with one end of said truss means extending over the back end of said vehicle means, said extending end of said truss means being secured to the top of the bell and the other end pivotally connected to said vehicle means, hoist means connected to said vehicle means and said truss means for raising said truss means and the bell connected thereto, and shock absorbing means connected between said vehicle and truss means for absorbing the upward recoil of said bell and truss means after an explosion.

References Cited in the file of this patent

UNITED STATES PATENTS

| 16,473 | Eads | Jan. 27, 1857 |
| 2,353,484 | Merten et al. | July 11, 1944 |
| 2,586,706 | Parr | Feb. 19, 1952 |

OTHER REFERENCES

Palmer: "A new approach to seismic exploration," World Oil magazine, June 1954, pages 140, 142, 146 (complete article on pages 140, 142, 146, 148, 151, 152, 154). (Copy in 181–0.53.)